United States Patent
Schuberg et al.

(10) Patent No.: US 12,271,347 B2
(45) Date of Patent: Apr. 8, 2025

(54) METHOD AND APPARATUS FOR IMPLEMENTING CHANGES TO A FILE SYSTEM THAT IS EMULATED WITH AN OBJECT STORAGE SYSTEM

(71) Applicant: SCALITY, S.A., Paris (FR)

(72) Inventors: Bjorn Schuberg, Paris (FR); Stéphane Cance, Montreuil (FR); Boris Faure, Courbevoie (FR); Viet Tuan Nguyen, Bussy-Saint-Georges (FR); Olivier Detour, Oullins (FR); Bradley King, Malakoff (FR)

(73) Assignee: Scality, S.A., Paris (FR)

( * ) Notice: Subject to any disclaimer, the term of this patent is extended or adjusted under 35 U.S.C. 154(b) by 369 days.

(21) Appl. No.: 17/363,719

(22) Filed: Jun. 30, 2021

(65) Prior Publication Data

US 2023/0006814 A1 Jan. 5, 2023

(51) Int. Cl.
G06F 16/00 (2019.01)
G06F 16/18 (2019.01)

(52) U.S. Cl.
CPC .................. G06F 16/18 (2019.01)

(58) Field of Classification Search
CPC .............................. G06F 16/18–196
See application file for complete search history.

(56) References Cited

U.S. PATENT DOCUMENTS

| 5,970,496 | A | * | 10/1999 | Katzenberger | ...... G06F 16/9024 707/999.102 |
| 8,429,444 | B2 | | 4/2013 | Rancurel et al. | |
| 9,355,120 | B1 | * | 5/2016 | Slik | ...................... H04L 67/1097 |
| 9,524,302 | B2 | | 12/2016 | Regni et al. | |
| 9,922,135 | B1 | | 3/2018 | Noble | |
| 10,248,682 | B2 | | 4/2019 | Regni et al. | |

(Continued)

FOREIGN PATENT DOCUMENTS

| EP | 2164005 A2 | 3/2010 |
| WO | 2015134677 A1 | 9/2015 |

(Continued)

OTHER PUBLICATIONS

International Search Report and Written Opinion for PCT Patent Application No. PCT/US22/35368, Mailed Oct. 17, 2022, 9 pages.

(Continued)

*Primary Examiner* — Dinku W Gebresenbet
(74) *Attorney, Agent, or Firm* — Compass IP Law PC

(57) ABSTRACT

A method is described. The method includes receiving logs from multiple connector nodes, each of the logs having entries that describe changes made to a file system at its respective one of the connector nodes. The method includes constructing a directed acyclic graph (DAG) from the logs' respective entries, the DAG comprising nodes connected by flows, the nodes describing actions made to directories and files of the file system, wherein, a flow of the flows connects a subset of the nodes that describe actions made to a particular directory or file of the file system. The method includes removing one or more irrelevant nodes from the DAG. The method includes applying actions described by remaining nodes of the DAG to an object storage system having respective objects for directories and files of the file system.

20 Claims, 16 Drawing Sheets

(56) References Cited

U.S. PATENT DOCUMENTS

| | | | |
|---|---|---|---|
| 10,366,070 B2 | 7/2019 | Regni et al. | |
| 10,409,770 B1* | 9/2019 | Ye | G06F 16/113 |
| 10,572,474 B2* | 2/2020 | Wright | G06F 16/9566 |
| 11,620,311 B1* | 4/2023 | Kumar | G06F 16/283 |
| | | | 707/602 |
| 2007/0067201 A1* | 3/2007 | Malewicz | G06Q 10/06311 |
| | | | 705/7.17 |
| 2010/0070698 A1* | 3/2010 | Ungureanu | G06F 16/10 |
| | | | 711/108 |
| 2015/0278397 A1* | 10/2015 | Hendrickson | G06F 16/9024 |
| | | | 707/798 |
| 2015/0378775 A1* | 12/2015 | Vermeulen | G06F 16/28 |
| | | | 707/703 |
| 2017/0091227 A1* | 3/2017 | Vermeulen | G06F 16/27 |
| 2017/0147709 A1 | 5/2017 | Ganz | |
| 2017/0192998 A1* | 7/2017 | Sergeev | G06F 16/22 |
| 2019/0079726 A1* | 3/2019 | Marks | G06F 16/9024 |
| 2019/0325048 A1* | 10/2019 | Watkins | G06F 16/2358 |

FOREIGN PATENT DOCUMENTS

| | | |
|---|---|---|
| WO | 2015134680 A1 | 9/2015 |
| WO | 2015200686 A1 | 12/2015 |

OTHER PUBLICATIONS

Extended European Search Report for Patent Application No. 22834089.9, Mailed Sep. 2, 2024, 13 pages.

Konstantopoulos Michalis et al: "Distributed Personal Cloud Storage without Third Parties", IEEE Transactions on Parallel and Distributed Systems, IEEE, USA, vol. 30, No. 11, Nov. 1, 2019 (Nov. 1, 2019), pp. 2434-2448, 15 pages.

* cited by examiner

Log For Connector Node B (Log B)

B1. MKDIR; name = res1/; key = 3; parent_key = 1; v = 1; v_P = 3;

B2. MOV_RNM_NOD; from_name = file1; to_name = res1; key = 2; from_parent_key = 1; to_parent_key = 3; v = 3; v_P_f = 4; v_P_t = 2;

B3. MKNOD; name = files; key = 5; parent_key = 3; v = 1; v_P = 3;

B4. CNTMOD; name = files; key = 5; parent_key = 3; v = 2; v_P = 3;

B5. REMNOD; name = file2; key = 4; parent_key = 1; v = 2; v_P = 6;

Log For Connector Node A (Log A)

A1. MKDIR; name = workdir; key = 1; parent_key = 0; v = 1; v_P = X;

A2. MKNOD; name = file1; key = 2; parent_key = 1; v = 1; v_P = 2;

A3. CNTMOD; name = file1; key = 2; parent_key = 1; v = 2; v_P = 3;

A4. MKNOD; name = file2; key = 4; parent_key = 1; v = 1; v_P = 5;

A5. CNTMOD; name = file2; key = 4; parent_key = 1; v = 2; v_P = 5;

Fig. 3

METHOD AND APPARATUS FOR IMPLEMENTING CHANGES TO A FILE SYSTEM THAT IS EMULATED WITH AN OBJECT STORAGE SYSTEM

FIELD OF INVENTION

The field of invention pertains generally to the computing sciences, and, more specifically, to a method and apparatus for implementing changes to a file system that is emulated with an object storage system.

BACKGROUND

With the emergence of big data, low latency access to large volumes of information is becoming an increasingly important parameter of the performance and/or capability of an application that processes or otherwise uses large volumes of information.

FIGURES

A better understanding of the present invention can be obtained from the following detailed description in conjunction with the following drawings, in which:

FIG. 3 shows exemplary logs having log entries;

DETAILED DESCRIPTION i. Overview

Figure 1:
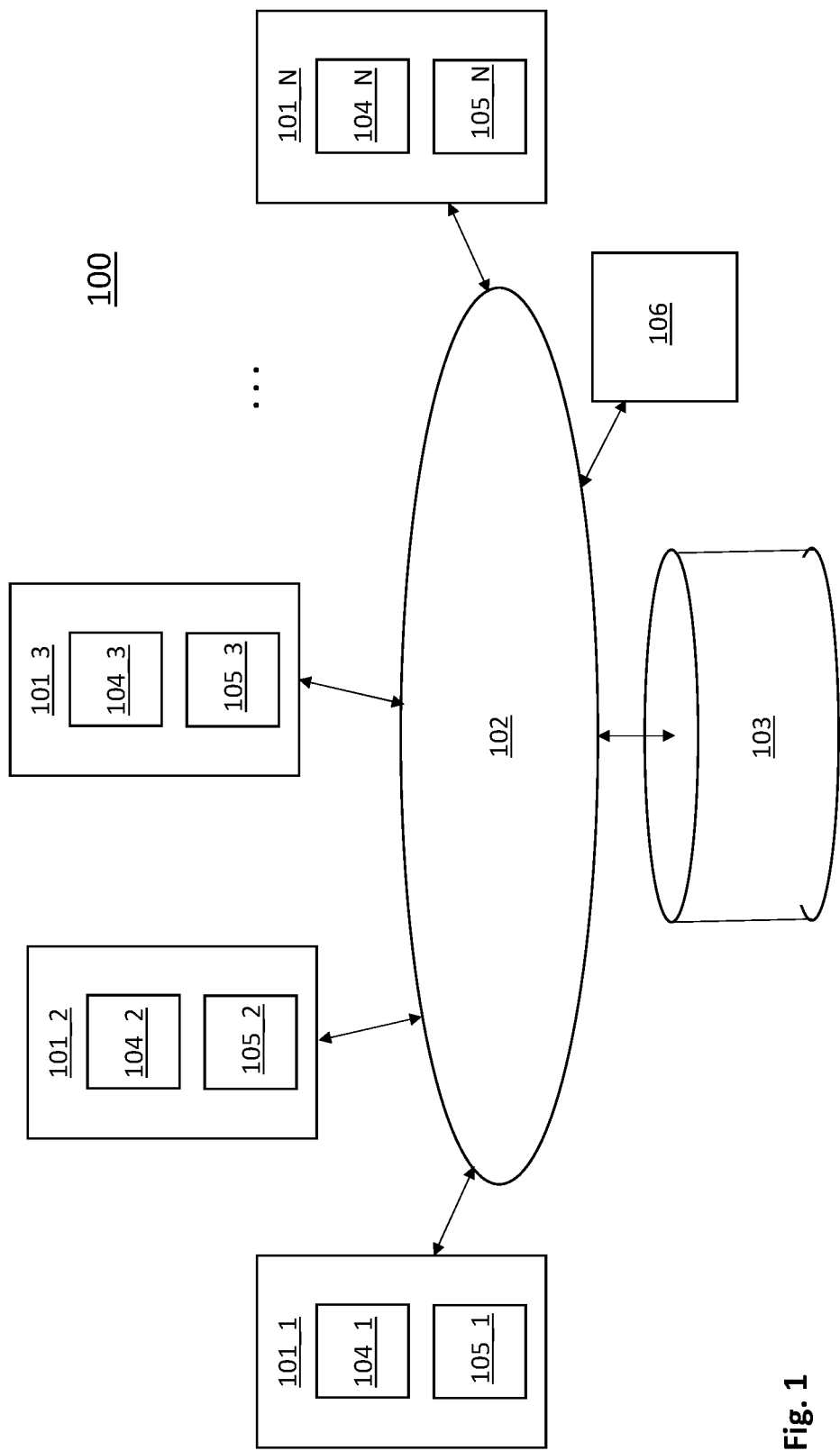
FIG. 1 shows a storage system.

FIG. 1 depicts a storage system 100 having improved operational efficiency as described in more detail below. As observed in FIG. 1, the storage system 100 includes multiple connector nodes 101 coupled to a network 102 and a physical storage resource 103. In operation, each connector node 101 presents one or more storage system interfaces to one or more users (e.g., client devices, customers, etc.). For example, connector node 101 may present any of a number of different file system interfaces to the users (e.g., FAT, NFS, NTFS, GFS2, GPFS, and/or any file system associated with and/or supported by various operating systems such as Microsoft Windows, Unix, Linux, MVS, and/or any file system associated with a cloud service such as S3 from Amazon Web Services (AWS), Azure from Microsoft, Google cloud storage, etc.).

Users send storage system commands (e.g., reads, writes) that are compliant with a particular interface's format/syntax to their connector node through the corresponding interface. The connector node then processes the request and applies it to the underlying storage system. The physical storage resource 103 need not be implemented as the same kind of storage system as the interface(s). For example, according to various embodiments, one or more of the interfaces that are presented to the users are file system interfaces whereas the physical storage resource 103 is implemented as an object storage system.

As is known in the art, a file system specifies locations in the system with a directory path, whereas, an object storage system identifies individual stored objects with their own unique key. With respect to the manner in which a file system is emulated with an object storage system, according to various embodiments, each directory and file in the file system is represented with its own unique object in the object storage system. As such, each file and directory has its own unique key and can be accessed by applying its key to the object storage system.

Particularly in the case of large scale storage systems, a challenge is providing the users with fast response times while ensuring that their commands are correctly reflected in the physical storage resource 103. An additional challenge is resolving conflicting requests (when two different users concurrently/simultaneously attempt to make a change to the same storage system resource (e.g., directory, file, etc.)).

In order to address these challenges each connector node 101 includes a local change event log 104 (or simply, "local log") and distributed locking logic 105. The local log 104 records changes that are made to a particular file system at the log's connector node by the connector node's user base. The distributed locking logic 105 ensures that changes made to any particular item in a database (e.g., a directory, a file, etc.) are performed in a strict sequential order that are defined and respected across the storage system.

Here, the distributed locking logic 105 assigns version numbers to directories and files. Any time the content of a file is changed, the version number of the file is incremented, and, any time a change is made to the structure/organization directly beneath a parent directory, the parent directory's version number is incremented. Because the locking mechanism operates across the entire file system, the strict sequential ordering of the versions of any particular file or directory is maintained across the entire file system (a connector node may operate with local copies of items but their versions are consistent with the same version of other copies of the same items on other connector nodes).

With respect to the information kept by the local log 104, a particular file system is viewed as an organization of directory items and file items (a folder is considered a directory item). File items and directory items are created and placed within ("beneath") a parent directory. File items and directory items have names. Over the course of the file system's existence, certain changes can be made to the file system such as the deletion of any directory or file, the movement of any directory or file to a different parent directory and/or a change to the name of any file or directory.

In various embodiments, as alluded to above, the physical storage resources 103 are implemented as an object storage system in which individual items are identified with keys rather than a directory file path. Here, for instance, a connector node 101 presents a file system interface to its users but internally maps the filepaths that are specified in the user commands to key values that are applied to the object storage system 103. The object storage system 103 stores objects each having its own unique key. Any particular object is accessed by providing the object storage system 103 with the object's key. To emulate a file system, the file system's directory items and file items are stored as objects within the object storage system 103.

In various embodiments implemented as described just above, the following information is recorded in a local log 104 for each file system change ("log entry event") made at the log's connector node:

1. the type of change that was made (e.g., creation of a file or directory; deletion of a file or directory; change to a file, movement of a file or directory, etc.);
2. the name of the item that was changed (e.g., the name of a file or directory);
3. the key for the item that was changed (the unique identifier for the item in the object storage system
4. the key of the item's parent directory;
5. the item's version after the change;
6 the parent directory's version after the change.

In the case of name changes, the recorded information additionally includes the new name of the item (where #2 above refers to the name of the item before the change). In the case of the movement of an item to a new parent directory, the recorded information additionally includes the key and version number of the "source" parent directory that the item was moved from (where #s 4 and 5 above refer to the key and version number of the "destination" parent directory that the item was moved to).

The local log 104 of each connector node 101 has access to the mapping logic of its respective connector node so that the file system directory path for any file or directory can be mapped to its corresponding key within the object storage system.

Figure 2:
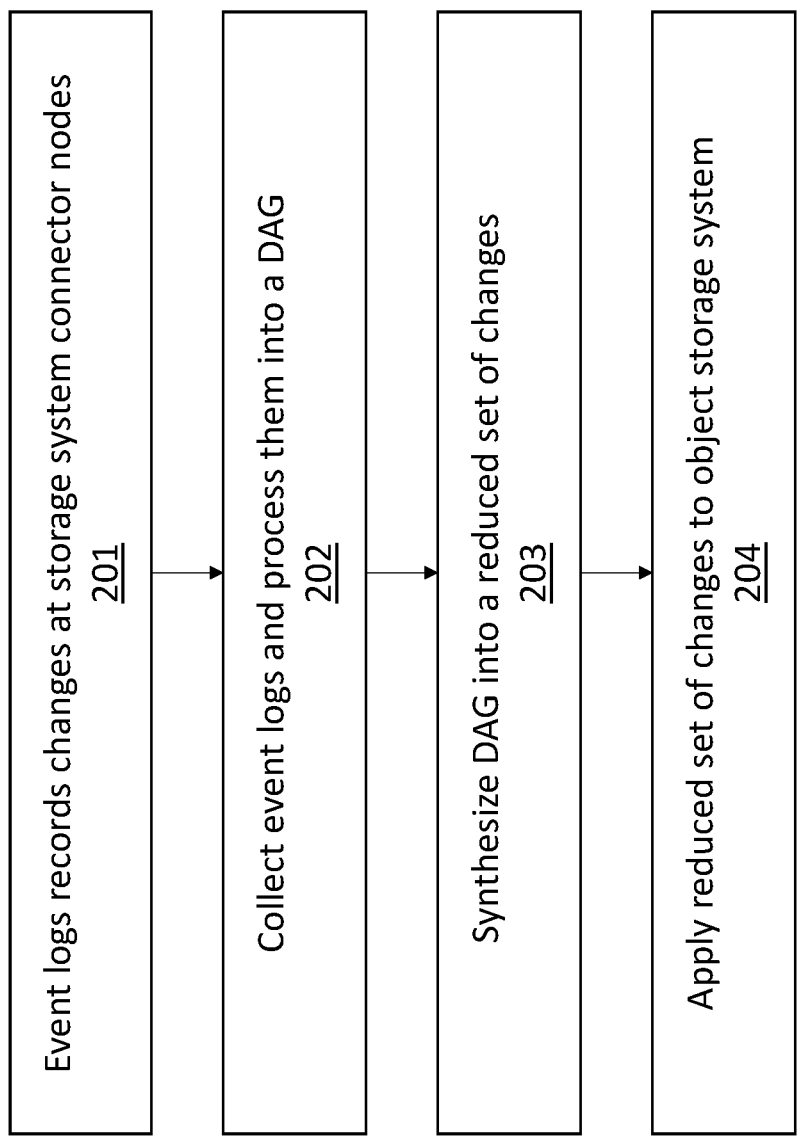
FIG. 2 shows a methodology performed by the storage system.

FIG. 2 shows a methodology that can be executed by the improved storage system of FIG. 1. As observed in FIG. 2, the event logs record change events 201 that they observe at their respective connector nodes. The event logs are then collected and processed into a directed acyclic graph (DAG) 202 that reflects the changes made across the multiple connector nodes. The DAG 203 is then synthesized into a reduced set of changes 203. The reduced set of changes are then applied to the object storage system 204.

ii. Recording of Log Events

FIG. 3 depicts an example of the recordation of changes in multiple event logs as represented by feature 201 of FIG. 2. Specifically, FIG. 3 shows the event histories for a pair of connector nodes ("A" and "B") for an exemplary operational sequence in which the connector nodes' respective users make changes to a file system that is emulated with an object storage system 103 as described above.

As observed in FIG. 3, a change made by a user at the first node A creates a directory named "workdir" at time T1. In response, the log for connector A creates event entry A1. As observed, event entry A1 within log A includes
1. the type of change (creation of directory ("MKDIR");
2. the name of the created directory ("workdir");
3. the key assigned to workdir/ (=1);
4. the key of the parent of workdir/ (=0=the root node of the file system);
5. the version for workdir/ (=1 because this is the first version of workdir/);
6. the version of the parent of workdir/ ("X" in this example as the root node can, at this point, be of any version).

Next, at time T2, a change is made at connector A that creates a file "file1" within workdir/. As such, the log for connector A creates event entry A2. As observed, event entry A2 within log A includes:
1. the type of change (creation of a file ("MKNOD");
2. the name of the created file ("file1");
3. the key assigned to file1 (=2);
4. the key of the parent of file1 (=1 because file1 has been created within workdir/);
5. the version for file1 (=1 because this is the first version of file1);
6. the version of the parent of file1 (=2, the version of workdir/ is incremented in response to the creation of file1 within workdir/).

Next, at time T3, a change is made at connector B that creates a directory "res/" within workdir/. As such, the log for connector B creates event entry B1. As observed in FIG. 3, event entry B1 within log B includes:
1. the type of change (creation of a directory ("MKDIR");
2. the name of the created directory (res/);
3. the key assigned to res/ (=3);
4. the key of the parent of res/ (=1 because res/ has been created within workdir/);
5. the version for res/ (=1 because this is the first version of res/);
6. the version of the parent of res/ (=3, the version of workdir/ is incremented in response to the creation of res/ within workdir/).

Next, at time T4, file1 is written to from connector A (file1 is modified). As such, the log for connector A creates event entry A3. As observed, event entry A3 within log A includes:
1. the type of change (file modification ("CNTMOD"));
2. the name of the file that was changed (file1);
3. the key assigned to file1 (=2 (see event entry A2));
4. the key of the parent of file1 (=1=workdir/);
5. the version for file1 (=2 because this is the second version of file1);
6. the version of the parent of file1 (remains at 3 because the directory structure directly beneath workdir/ is the same before and after the write to file1).

Next, at time T5, a change is made at connector B that moves file1 from directly beneath workdir/ to directly beneath res/. The file is also renamed to "res1". As such, the log for connector B creates event entry B2. This particular change is of the type that triggers additional content within the log entry. As observed, event entry B2 within log B includes:
1. the type of change (file move and file name change ("MOV_RNM_NOD");
2a. the old/from name of the file ("file1");
2b. the new/to name of the file ("res1");
3. the key of the file being moved (=2);
4a. the key of the file's old/from parent directory (=1=workdir/);
4b. the key of the file's new/to parent directory (=3=res/);
5. the version of the file (=3);
6a. the version of the file's old/from parent directory (v_P_f=4, the version of workdir/ is incremented in response to this change);
6b. the version of the file's new/to parent directory (=2, the version of res/ is incremented in response to this change).

Next, at time T6, a change is made at connector A that creates a new file "file2" in workdir/. As such, the log for connector A creates event entry A4. As observed, event entry A4 within log A includes:
1. the type of change (creation of a file ("MKNOD"));
2. the name of the created file ("file2");
3. the key assigned to file2 (=4);
4. the key of file2's parent directory (=1 because file2 has been created within workdir/);
5. the version for file2 (=1 because this is the first version of file2);
6. the version of file2's parent directory (=5, the version of workdir/ is incremented in response to the creation of file2 within workdir/).

Next, at time T7, a change made from connector A writes to file2 (file2 is modified). As such, the log for connector A creates event entry A5. As observed in FIG. 3, event entry A5 within log A includes:
1. the type of change ((file modification ("CNTMOD"));
2. the name of the file that was changed (file2);
3. the key assigned to file2 (=4 (see event entry A4));
4. the key of file1's parent directory (=1=/workdir);
5. the version for file2 (=2 because this is the second version of file2);
6. the version of the parent of file2 (remains at 5 because the directory structure directly beneath workdir/ is the same before and after the write to file2).

Next, at time T8, a change made at connector B creates a new file "files" in res/. As such, the log for connector B creates event entry B3. As observed in FIG. 3, event entry B3 within log B includes:
1. the type of change (creation of a file ("MKNOD"));
2. the name of the created file ("files");
3. the key assigned to files (=5);
4. the key of files's parent directory (=3 because files has been created within res/);
5. the version for files (=1 because this is the first version of files);
6. the version of files's parent directory (=3, the creation of files changes the directory structure directly beneath res/).

Next, at time T9, another change made from connector B writes to files (files is modified). As such, the log for connector B creates event entry B4. As observed in FIG. 3, event entry B4 within log B includes:
1. the type of change ((file modification ("CNTMOD"));
2. the name of the file that was changed (files);
3. the key assigned to files (=5 (see event entry B3));
4. the key of the parent of files (=3=res/);
5. the version for files (=2 because this is the second version of files);
6. the version of files's parent directory (remains at 3 because the directory structure directly beneath res/ is the same before and after the write to files).

Finally, at time T10, a change made at connector node B removes file2 from /workdir but does not delete file2 from the file system. In this case, file2 exists but it has not been assigned any specific location within the file system hierarchy. In response, the log for connector B creates event B5 which specifies the removal of file2 from workdir/.
1. the type of change (removal of file from directory ("REMNOD");
2. the name of the file that was removed (file2);
3. the key of file2 (=4 (see event A4);
4. the version of file2 (remains at 2 because the content and name of file2 remain unchanged)
5. the key of file2's old/from parent directory (=1=workdir/);
6. the version of file2's old/from parent directory (=6, the removal of file2 changes the directory structure directly beneath workdir/).

iii. Processing of Log Events into a DAG

As described above with respect to FIG. 2, once changes have been recorded 201 in the respective logs of the respective connector nodes, they are collected (e.g., sent to a centralized location such as node 106 of FIG. 1) and a DAG is constructed from their entries (e.g., node 106 of FIG. 1 includes processing logic for constructing a DAG from the events of multiple logs).

FIGS. 4a through 4j show an example of the application of the DAG construction methodology 203 of FIG. 2 to the exemplary scenario of changes that were described above with respect to FIG. 3.

With respect to the construction of the DAG, actions made to specific items in the file system are represented with individual nodes within the DAG. The sequence of actions taken to any specific item over time are reflected in flows from one action/node to the next concerning the item. For example, the initial creation of any file item or directory item is represented with its own unique node in the DAG. Subsequent changes involving the file item or directory item are then tracked with flows in the DAG that emanate from the item's creation node.

Special "linking" and "un-linking" nodes are introduced into the DAG to represent the placement (linking) or removal (un-linking) of file items and directory items to/from their respective parent directories. For example, to represent the placement of a file item or directory item beneath its parent directory, a link node is inserted into the DAG that "links" a first flow that represents the file/directory item being placed beneath the parent directory with a second flow that represents the parent directory item.

Likewise, if a file/directory item is removed from its immediate parent directory, a first flow that represents the file/directory item and a second flow that represent the parent directory flow into a same "un-link" node. Other nodes correspond to other changes made to the file-system such as modifications/writes made to file items, deletions of file/directory items, etc.

With respect to the first entry B1 in log B, the res/ directory is created and placed beneath the workdir/ directory. As such, as observed in FIG. 4a, first DAG node 401 is created for the creation of the res/ directory. The node 401 includes a description of the action ("MKDIR"=creation of a directory), the name of the affected item ("res/"), the key and the version for res/ as recorded in the entry (key=3 and v=1).

Because entry B1 infers the pre-existence of the workdir/ directory (the DAG processing logic has not processed the event that creates workdir/), a second "shadow" node 402 is created for the workdir/ directory.

As will become more clear in the following discussion, shadow nodes are created for items for which no creation event has yet been processed by the DAG logic. Shadow nodes are eventually replaced with the creation node for the item once the DAG logic processes the creation event. Shadow nodes are given shadow node status in their description in the DAG (in the particular example of FIGS. 4a through 4j, shadow nodes are represented with dashed lines).

Figure 4A:
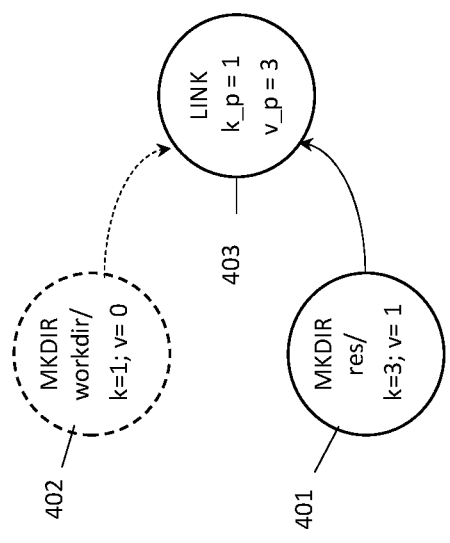
FIGS. 4a, 4b, 4c, 4d, 4e, 4f, 4g, 4h, 4i and 4j show a directed acyclic graph (DAG) being constructed from the log entries of FIG. 3.
Figure 4B:
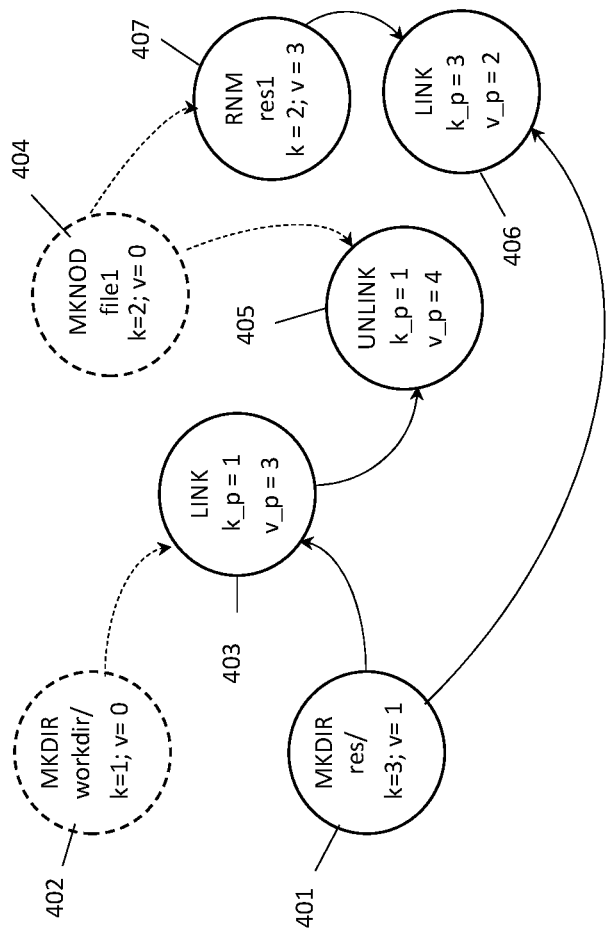
Figure 4C:
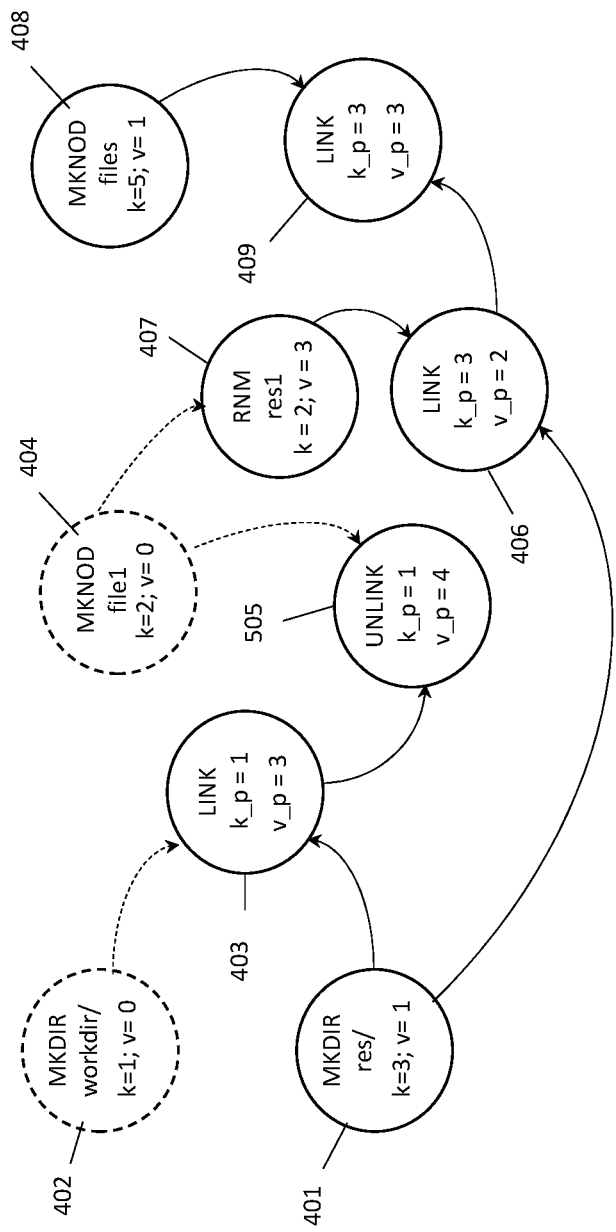
Figure 4D:
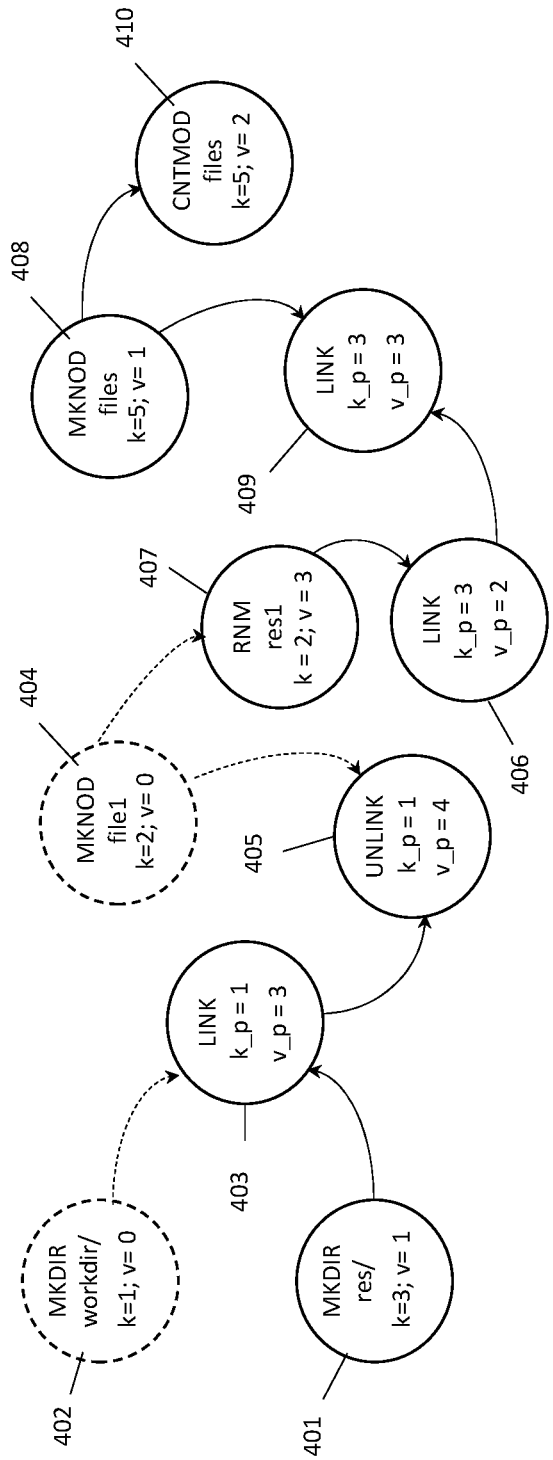
Figure 4E:
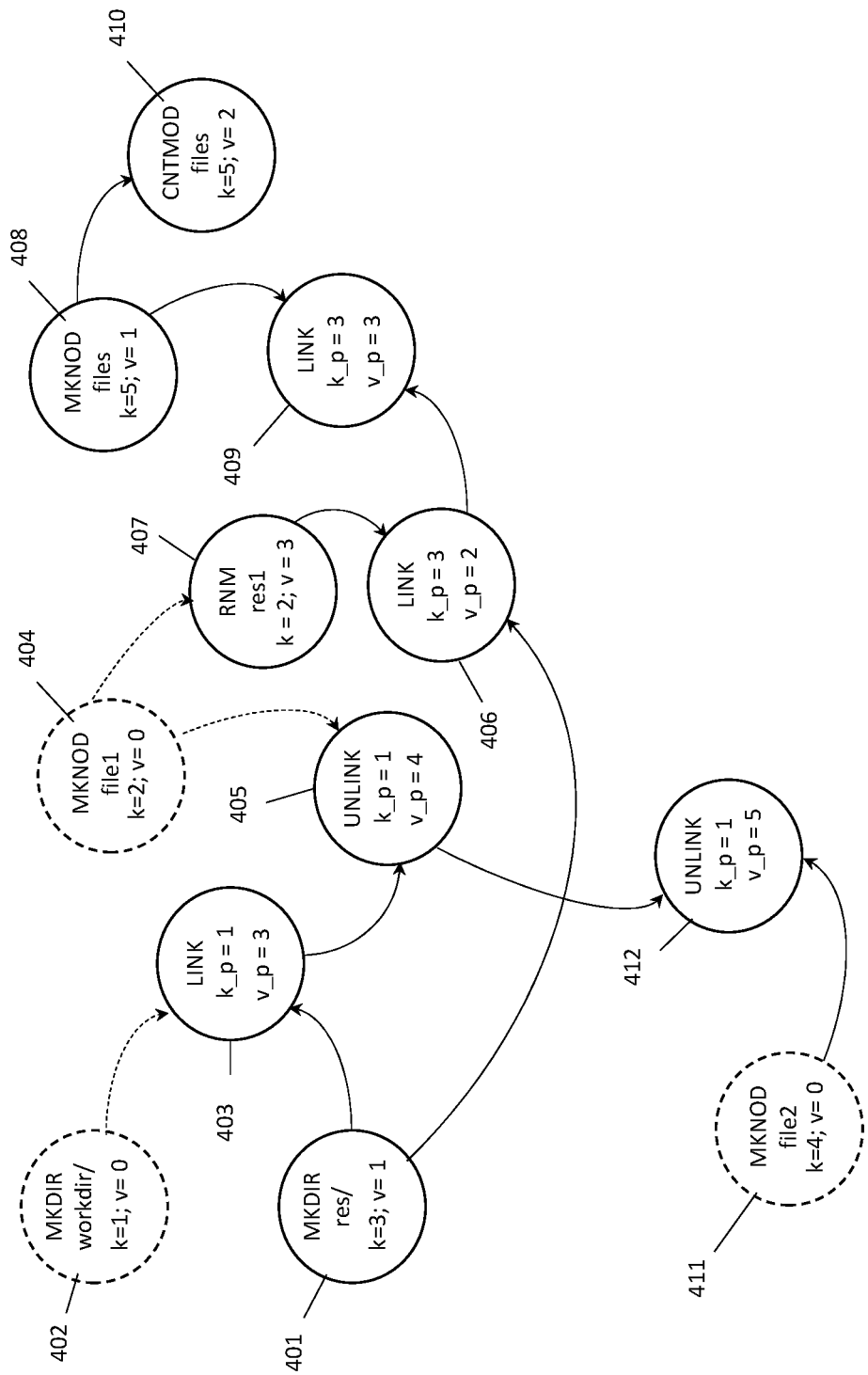
Figure 4F:
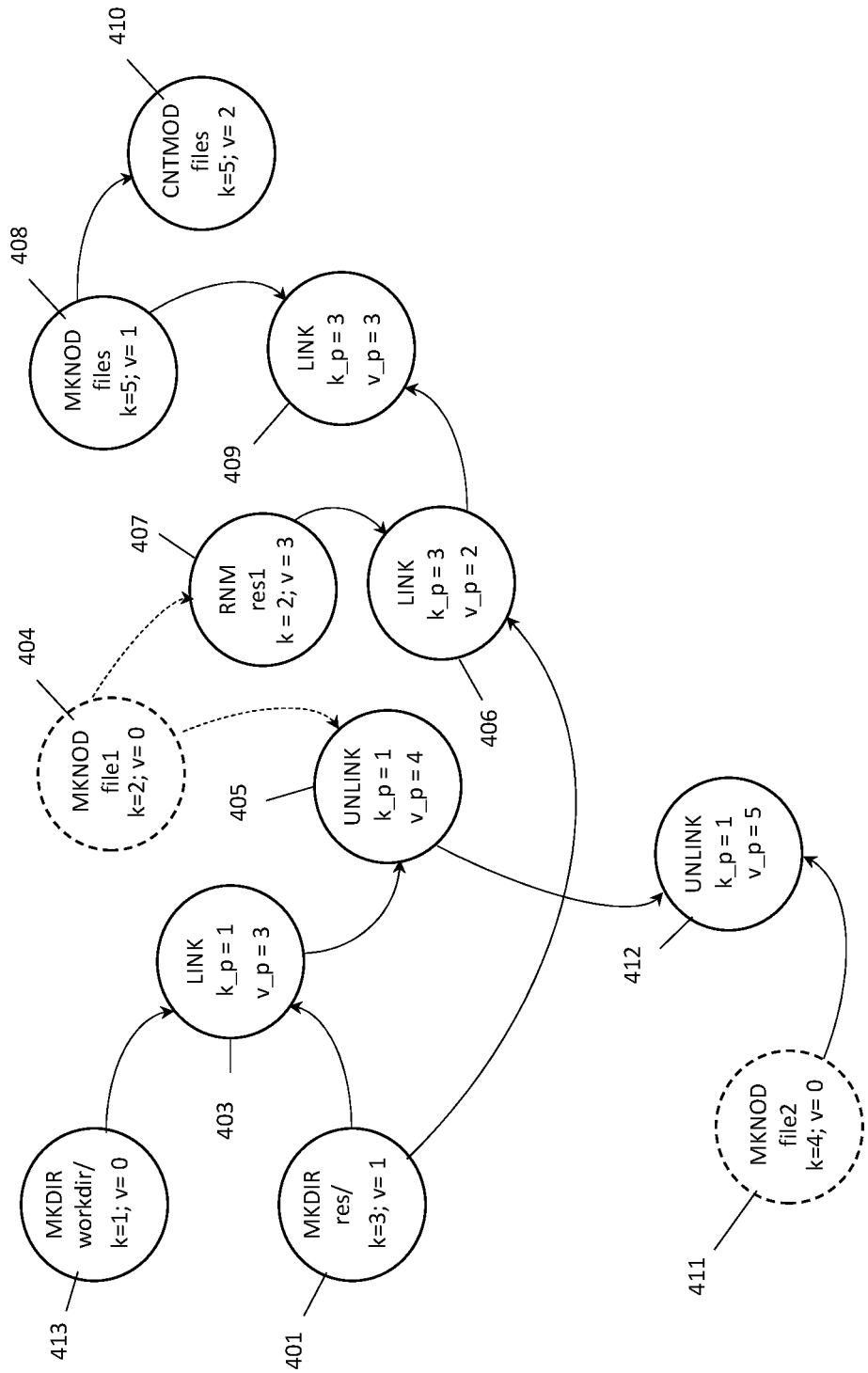
Figure 4G:
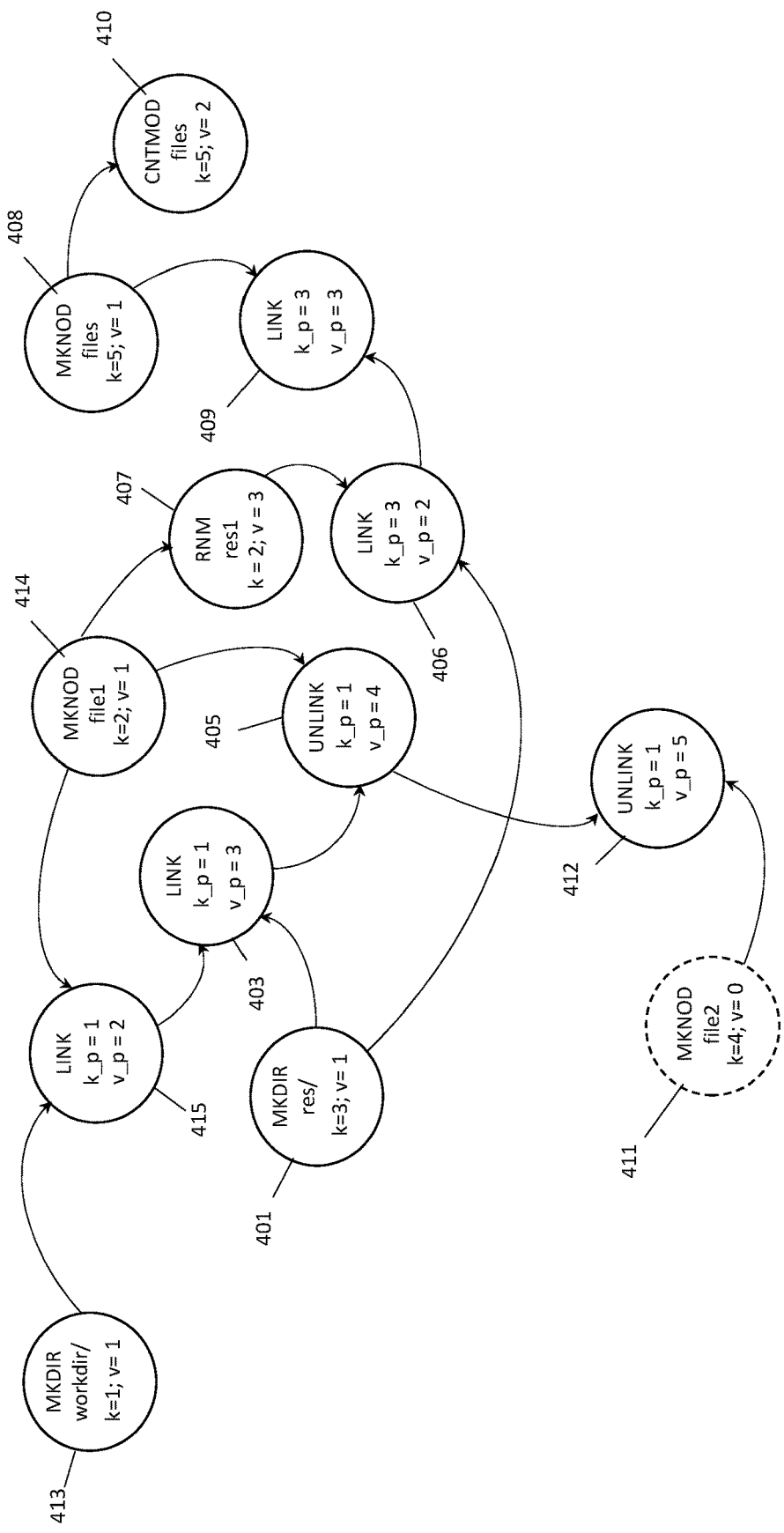
Figure 4H:
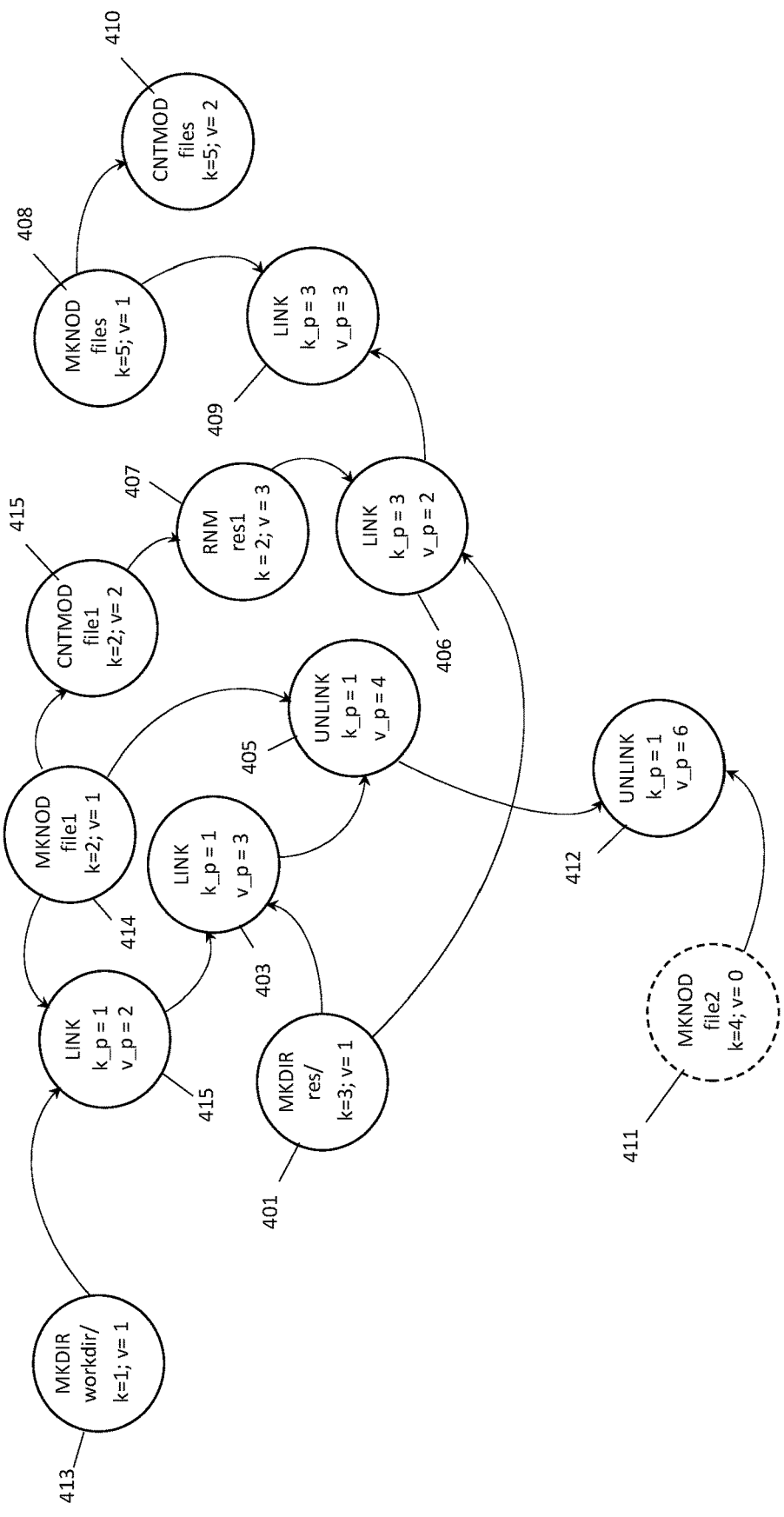

As observed in FIG. 4a, the shadow node 402 for the creation of workdir/ includes the event ("MKDIR"=creation of a directory), the name ("workdir/"), the key as recorded in the log entry being processed (key=1). According to one embodiment, the status of shadow node is reflected in the node with a default version of 0 (v=0). That is, whereas actual creation nodes are given a version of v=1, by contrast, shadow creation nodes are given a version of v=0 which signifies their shadow status.

To complete the processing of entry B1, a linking node 403 is entered in the DAG to represent the placement of res/ beneath workdir/. Here, flows from each of nodes 401 and 402 flow into link node 403. Link node 403 identifies the key of the parent (workdir/, k=1) and the version of the parent after the link as recorded in the log entry (v=3). Note that the flow from /workdir is consistent in that the version numbers of /workdir increase when progressing through workdir/'s flow. At this point, the processing of the first entry B1 in log B is complete.

The second entry B2 in log B is then processed. The second entry describes the renaming of "file1" to "res1" and the movement of the file from workdir/ to res/. Here, referring to FIG. 4b, the existence of file1 is inferred because log B does not include the event that created file1. As such, a shadow node 404 for file1 is inserted in the DAG having the key for file1 as recorded in the entry (key=2) and a default version of 0 (v=0).

In order to represent the movement of file1 from workdir/ to res/, an unlink node 405 is inserted in the DAG to represent file1's removal from workdir/ and a link node 406 is inserted into the DAG to represent file1's insertion beneath res/. Notably, the version for workdir/ as recorded in the entry is v=4 which is one increment above the version of workdir/ after res/ was created and placed beneath it (entry B1). As such, a flow is added that flows directly from node 403 to node 404. That is, nodes that contain versions of a same item/key (in this case, workdir/ having key k=1) are connected by a flow from lesser version number to higher version number.

To reflect the name change of the file and its movement into res/, an event node 407 is inserted for the name change (RNM) between the shadow node 404 for file1 and the link node 406 that inserts res1 beneath res/. The name change node 407 contains the new version of the file as recorded in entry B2 (v=3). The link node 406 contains the key (k=3) of the parent directory (res/) and its version after the file res1 in inserted beneath it (v_p=2). Because nodes 406 and 401 describe versions of the same item/key (directory res/ having key k=3) where node 401 has the lesser version and node 406 has the higher version, a flow is created from node 401 to node 406. At this point the processing of the second log entry is complete.

The third entry B3 of log B describes the creation of the "files" file and its placement under the res/ directory. Here, referring to FIG. 4c, because the log describes the actual creation of the file, a true creation node 408 (not a shadow node) is inserted into the DAG with the key number and version for the file as specified in the entry (key=5, v=1). A link node 409 that represents the insertion of "files" beneath res/ is also inserted into the DAG having the new version number (v_p=3) for the res/ parent directory (k_p=3). The "files" node 408 flows into the link node 409 to represent the placing of files beneath res/. Because the version of res/ in node 409 is higher than the version of res/ in node 406, a direct flow from node 406 to node 409 is also added to the DAG.

The fourth entry B4 of log B describes the modification made to "files". Here, as observed in FIG. 4d, a node 410 is created and entered to the DAG that represents the modification. The node includes the incremented version for "files" as contained in the B4 entry (v=2). A flow is therefore added that flows from the creation node 408 to the modification node 410.

The fifth entry B5 of log B describes the removal of "file2" from workdir/. Here, as observed in FIG. 4e, because log B does not include an entry for the creation of "file2", a shadow node 411 is inserted in the DAG to represent the existence of "file2". The node includes file2's key as specified in the B5 entry (k=4) and a default version of 0.

To represent the removal of file2 from workdir/, an unlink node 412 is added to the DAG and the file2 shadow node 411 flows into the un-link node 412. Notably, the version of workdir/ as reflected in the B5 log entry (v_p=6) is less than the version within node 405 (v_p=4, which reflects the change made to workdir/ when "file1" is removed from beneath it). As such, a flow is drawn from node 405 to node 412. Finally, even though file2 was removed from workdir/, file2 was not deleted. As such, the DAG reflects both the existence of file2 (node 411) and its lack of being underneath any directory (node 411 flows into an un-link node 412 and does not flow into any link node).

At this point the processing of the log B is complete and log A is next processed. The first event A1 in log A describes the creation of workdir/. As such, as observed in FIG. 4f, the shadow node 404 that was put in place for workdir/ is removed and a node 413 that represents the actual creation of workdir/ is inserted in its place with key=1 and version=1 as described in the A1 log entry.

The next entry A2 in log A describes the creation of file1 and its insertion beneath workdir/. As such, referring to FIG. 4g, the shadow node 404 that was put in place for file1 is removed and is replaced by the actual creation node 414 for file1 having key=2 and version=1 as specified in the A2 entry. A link event 415 is also added to reflect the insertion of file1 beneath workdir/. Node 414 therefore flows into node 415. As articulated in the A2 log entry, the version of workdir/ is v=2 after the insertion of file1. As such, a flow is drawn from node 413 (workdir/ v=1) to node 415 in the DAG. Moreover, with node 415 having v=2 for workdir/ and node 403 having v=3 for workdir/, a flow is drawn from node 415 to node 403.

The next entry A3 in log A is a write to file1. As such, referring to FIG. 4h, a node 415 is added to the DAG to represent the write which results in file1 having version v=2 as specified in the A3 entry. As such, the newly added node is inserted with corresponding flows between nodes 414 and 407 which represents versions v=1 and v=3 of file1.

Figure 4I:
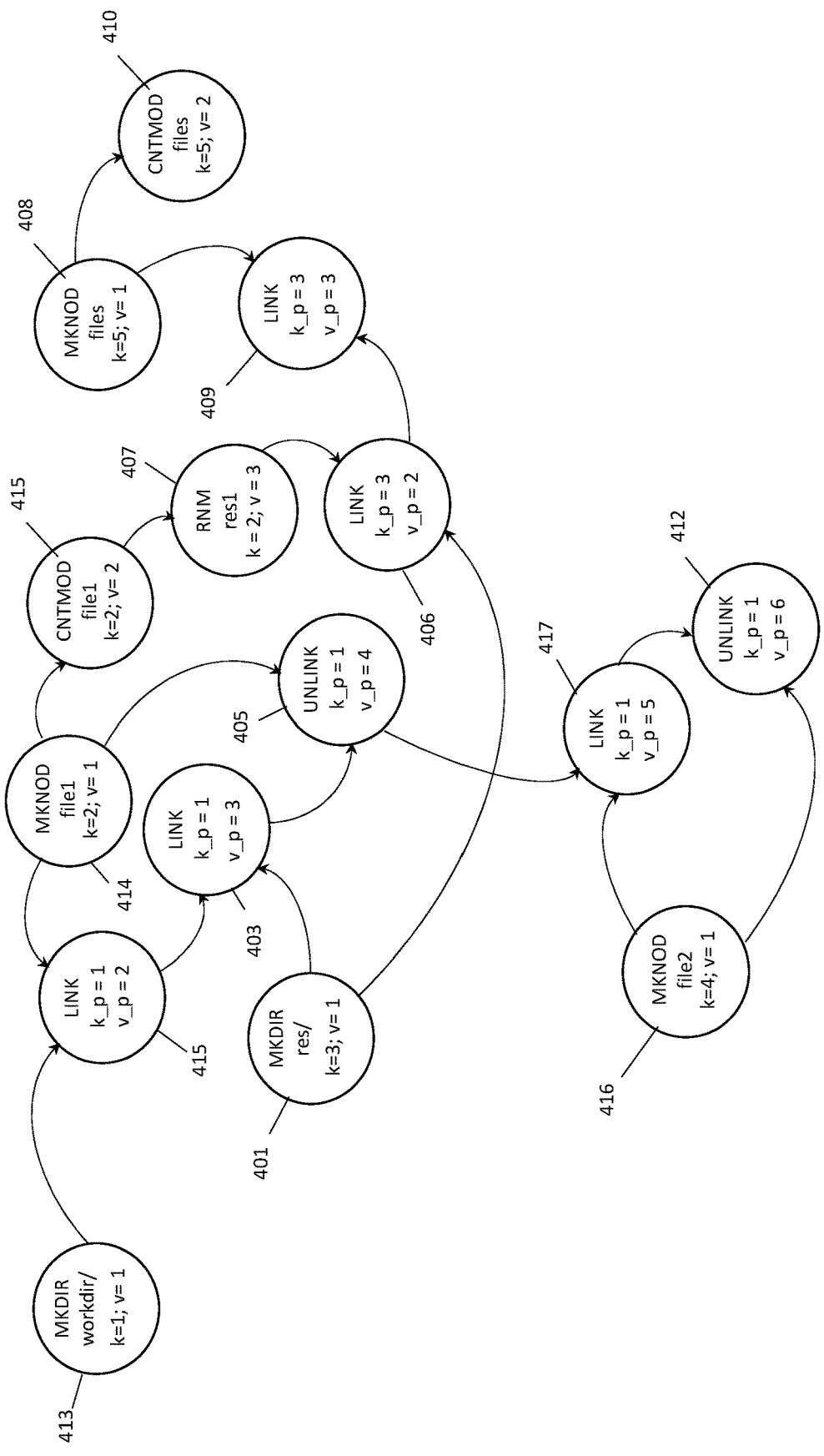

The next entry A4 in log A is the creation of file2 and its inclusion beneath workdir/. Referring to FIG. 4i, the shadow node 411 that was originally created for file2 is replaced with an actual creation node 416 having key=4 and version v=1. As specified in the A4 entry, the inclusion of file2 beneath workdir/ corresponds to the 5$^{th}$ version of workdir/. As such the link node 417 that is added to the DAG to represent the inclusion of file2 beneath workdir/ is inserted between nodes 405 and 412 with corresponding flows.

The last entry A5 of log A is a modification to file2 which increments the version of file2 from v=1 to v=2. As such, referring to FIG. 4j, a flow from file2's creation node 416 to the new modification node 418 is inserted into the DAG.

Although not addressed in the above example, in the case of the deletion of an item, in various embodiments, the version of the item is incremented in the log entry that describes the deletion. A deletion node is inserted into to the DAG for the item and receives a flow consistent with its version number (which should be its highest version number that terminates its flow). For example, if file2 were subsequently deleted, a node would be added to the DAG that describes the deletion and receives a flow from node 418.

Moreover, in the above example each file and directory item that was processed was also newly created. In other scenarios changes are made to an item that was created a long time ago and thus its creation event is not processed in the collection of log entries. In this case the shadow node remains in the completed DAG. The presence of the shadow node signifies to the system that the object for the item already exists in the object storage system and need not be created (the change(s) can be made directly to it).

In additional embodiments, attributes (e.g., time of last access, time of last write, permissions, etc.) are also kept for directories and/or files. The attributes are essentially additional files that are associated with their respective directory/file (e.g., have overlapping directory path). In various embodiments, log entries record changes made to attributes (e.g., by the storage system or storage system manager) no differently than user files or directories and are likewise mapped to a DAG no differently than user files or directories.

Figure 5:
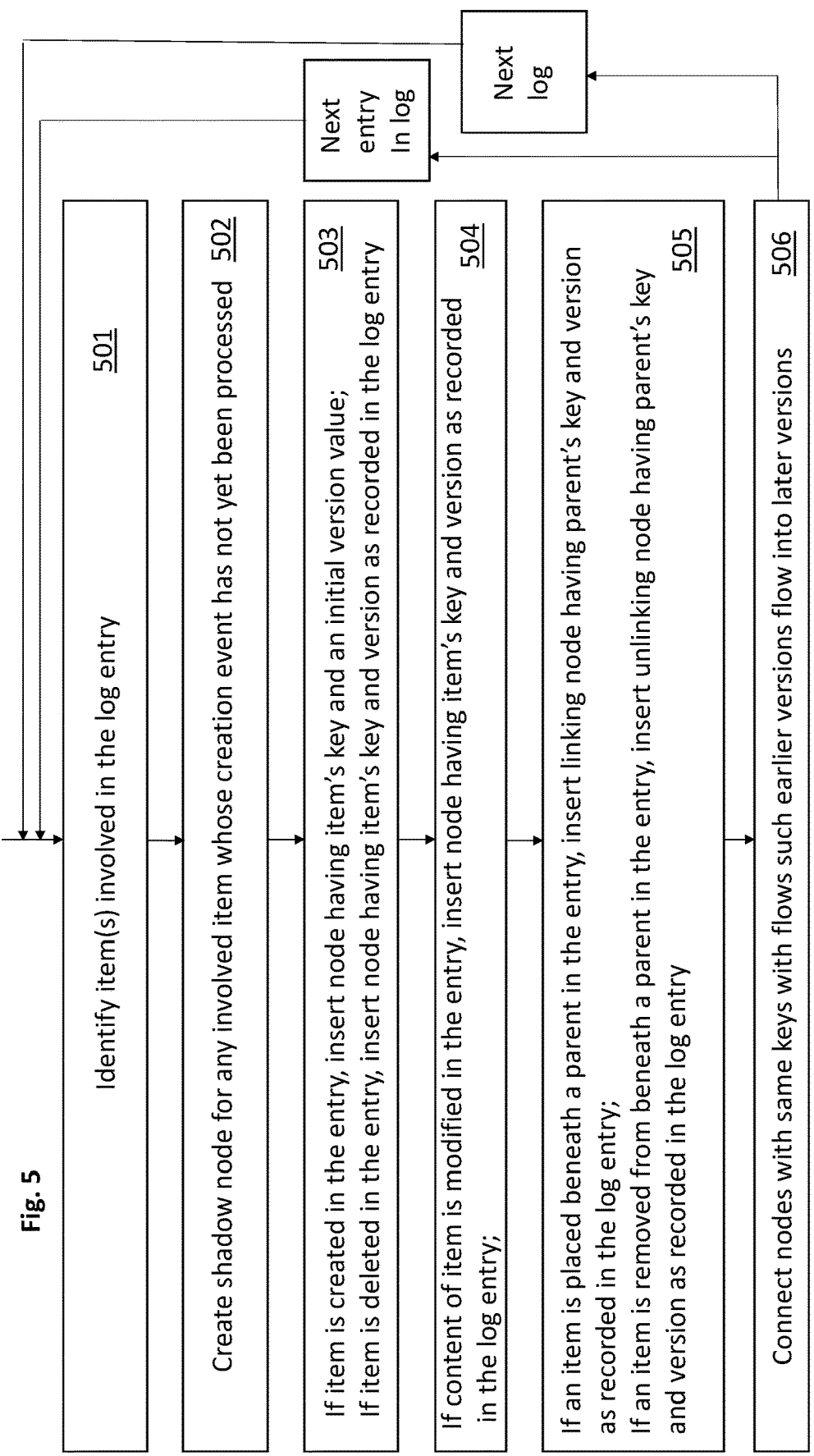
FIG. 5 shows a method for constructing a DAG.

FIG. 5 depicts a flow diagram for a DAG construction process that is consistent with the example discussed above. As observed in FIG. 5, after a log amongst multiple logs has been selected, an entry from the chosen log is selected and the item(s) (e.g., directory items and/or file items) that are acted upon by the entry are identified 501. If there is no existing node in the DAG for any of the item(s), a respective shadow node is created for such item(s) 502 (unless the log entry being processed includes the creation of the item(s)).

If an item is created in the entry being processed, a node that describes the creation having the item's key and its initial version value is inserted into the DAG 503. If an item is deleted in the entry being processed, a node that describes the item's deletion is inserted into the DAG having the item's key and its version number as recorded in the entry 503.

If the content of an item is modified (such as a file, the attributes of a file or the attributes of a directory), a node that indicates the item was modified is inserted into the DAG having the item's key and version number as recorded in the entry 504.

If an item is inserted beneath a parent directory, a linking node is added to the DAG having the parent directory's key and version number after the item's insertion as recorded in the entry 505. If an item is removed from beneath a parent directory, an un-linking node is added to the DAG having the parent directory's key and version number after the item's insertion as recorded in the entry 505.

After all nodes have been added to the DAG, flows are drawn to connect nodes having same keys in correct version order (from lower version number to higher version number). Linking and un-linking nodes not only receive/emanate flows for the respective parent directory but also receive flows from the item being inserted/removed from beneath the parent directory.

iv. Synthesis into Reduced Set of Changes and Application to Object Storage System Referring back to FIG. 2, after the DAG has been constructed from the log entries 202, it is synthesized into a reduced set of changes 203 and the changes are then applied to the object storage system 204. Referring briefly back to FIG. 1, the synthesis can be performed by the same logic 106 that collects log entries and constructs a DAG from them. This same logic can also apply the changes or other orchestrate them.

Figure 4J:
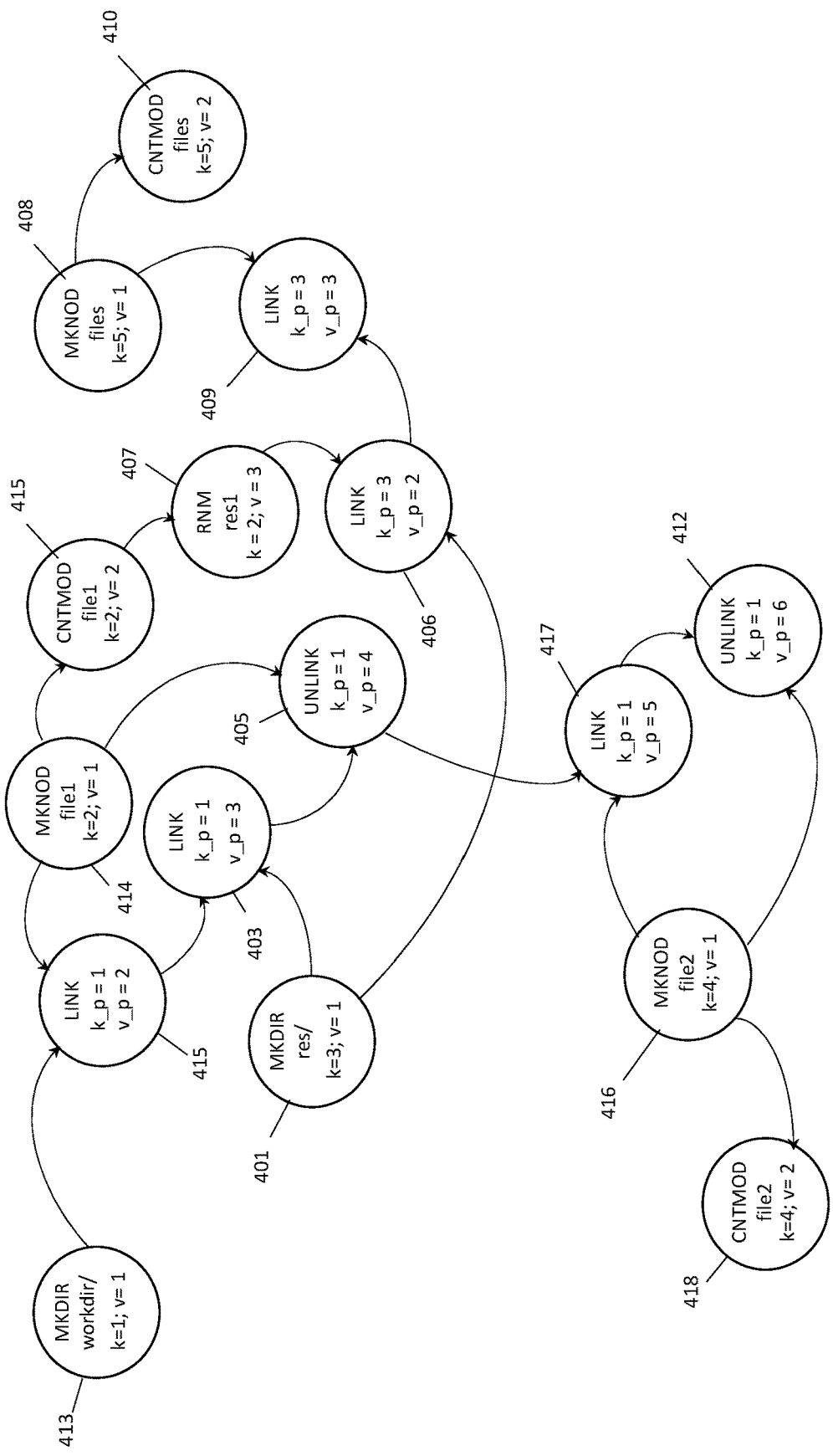

Here, referring to back to FIG. 4j, note that the sequences of changes made directly beneath a directory can be understood by following the flow of linking and unlink nodes having a same parent directory key value. For example, the sequence of changes made directly beneath workdir/ is described by the sequence of nodes 415, 403, 405, 417 and 412. Likewise, the sequence of changes made directly beneath res/ is described by the sequence of nodes 406 and 409. The flows commence from the creation node of their respective directory (node 413 for workdir/ and node 401 for res/).

By contrast, the sequence of changes made to any file item can be understood by following the flow of nodes having the file's key. For example, the flow of changes made to file1 is described by the sequence of nodes 415, 417. Likewise, the flow of changes made to files is described by node 410 and file2 by node 418. As with directories, the flows commence from the creation node of their respective file (node 414 for file1, node 408 for files and node 416 for file2.

The DAG can therefore be synthesized into a reduced set of changes by eliminating ultimately irrelevant changes made along the flow for a particular directory or file. Here, according to one embodiment, ultimately irrelevant changes can correspond to: 1) the linking and then subsequent un-linking of a same item from beneath a directory; 2) all content modifications made to a file before its most recent modification (the version of the file after the most recent modification would include all previous changes made to the file); 3) all name changes made to a file or directory before its most recent name change; 4) all content modifications made to a file and all name changes made to a file or directory prior to its deletion.

Figure 6:
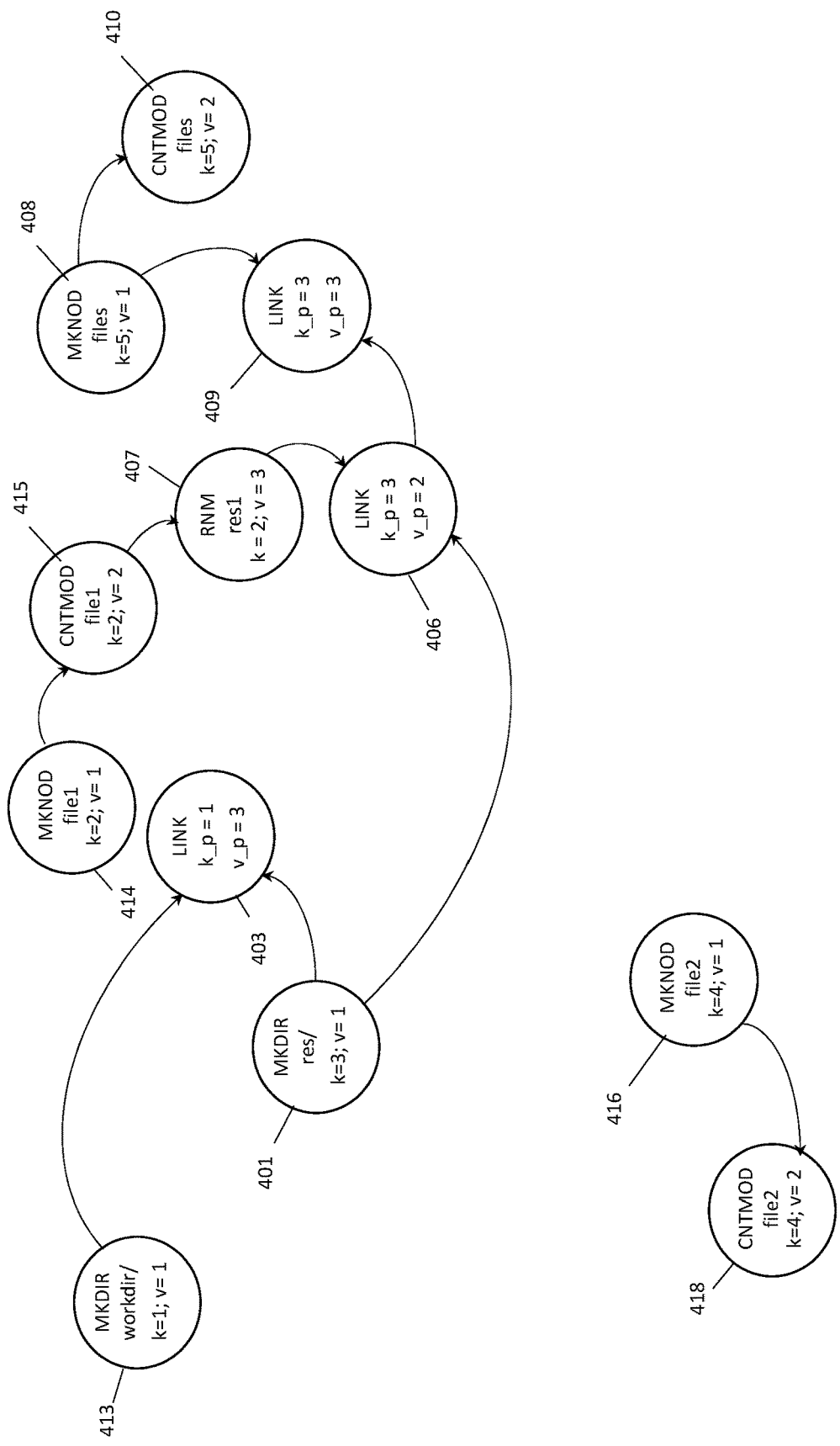
FIG. 6 shows a synthesized DAG.

Only scenario 1) above is applicable to the DAG of FIG. 4j. Specifically, scenario 1) above applies to link and un-link nodal pair 417, 412 and by link and un-link nodal pair 415, 405. As such, nodes 417, 412, 415 and 405 can be removed from the DAG (with the respective flow of each removed node being modified to connect the removed node's immediately prior node and immediately subsequent node). The resultant DAG is shown in FIG. 6.

Notably, separate flows exist for each of the directories and files. As such, changes to be made to any particular directory or file can be readily defined by analyzing the flow whose nodes have the directory's/file's key and increment in version number. Once the set of changes are defined for a particular directory or file they are applied to the storage system consistently with the object storage system's command protocol. Depending on the particular command protocol, some changes may be grouped into a single command.

Regardless, because changes can be identified for directories and files separately, they can be applied to the object storage system concurrently. That is, because they each have their own unique key, their changes can be applied in parallel without conflict.

A set of changes to be applied to the object storage system is then constructed from the remaining nodes in the DAG. The precise number of object storage system commands that are generated can depend upon the specific architecture of the object storage system, the manner and/or syntax by which commands are submitted to the object storage system and/or the manner in which the file system is emulated by the object storage system (among other possible influences).

Regardless, of how the changes are applied, the set of changes to be made to any file or directory is defined by the changes that are present along the flow for a particular item (the flow strings together DAG nodes having a same key value) after the irrelevant changes have been removed.

The set of changes to be made to the object storage system as determined from the DAG flow for any file can include the file's creation, the file's most recent name change, and the storage of the file's most recent version to the extent the corresponding changes are present in the file's flow in the DAG. If the file is not actually created in the processed log entries, a shadow node will remain in the DAG which does not result in any action applied to the object storage system (the object that represents the file already exists in the object storage system).

Referring to FIG. 3, in order to effect the creation of a file, a new object is stored in the object storage system 103. In order to effect a name change of the file, a new name is recorded in the object that represents the file within the storage system. According to one approach, in order to store the most recent version of a file, the object having the most recent change is physically stored in the object storage system 103 from the connector node where the change was made (e.g., logic 106 informs the connector node to commit the object to the object storage system 103). Here, again, the connector nodes are presumed to include caches or otherwise make changes to physical copies or representations of objects that are correctly versioned at the connector nodes 101 according to the versioning logic 105.

The set of changes to be made to the object storage system as determined from the DAG flow for any directory can include the directory's creation, the directory's most recent name change, each new insertion of an item that was not subsequently removed and each new removal of an item that was not subsequently inserted. If the directory is not actually created in the processed log entries, a shadow node will remain in the DAG which does not result in any action applied to the object storage system (the object that represents the directory already exists in the object storage system).

Referring to FIG. 3, in order to effect the creation of a directory, a new object is stored in the object storage system 103. In order to effect a name change of a directory, a new name is recorded in the object that represents the directory within the storage system.

In various embodiments, the object that represents a directory within the object storage system 103 includes one or more pages (e.g., text documents) that lists the items (files and sub-directories) that are directly beneath the directory within the file system. As such, new insertions of files or sub-directories beneath a directory are effected by adding them to the list in the object that represents the directory. Likewise, new removals of files or sub-directories from beneath a directory are effected by deleting them from the list in the object that represents the directory.

Referring to the reduced DAG of FIG. 6, assuming all changes to be made for a single file can be made in a single command, the following changes will be made:

1. store a new file object having key=2, name="res1" and the content of the v=2 version of file1 (consolidation of nodes 414, 415, 407);
2. store a new file object having key=4, name="file2" and the content of the v=2 version of file 2 (consolidation of nodes 416, 418);
3. store a new file object having key=5, name="files" and the content of the v=2 version of files (consolidation of nodes 408, 410);
4. create a new directory workdir/ beneath the root directory;
5. create a new directory res/ beneath workdir/
6. store the "res1" and "files" file objects beneath res/.

Although the description above has emphasized a collection of basic actions that can be made to a file or directory and their representations in the log entries and the DAG, other embodiments may describe more complicated "macro" actions that, e.g., are a collection of such actions. For example, a single action, log entry and DAG node may be constructed for a directory insertion that includes a change of the name of the item that is being inserted.

v. Closing Comments

Referring back to FIG. 1, any of the log logic 104, the versioning logic 105 and the DAG construction, synthesis and change application logic 106 can be implemented as software programs that execute on a respective computing system such as a computer. Here, for example, each of connector nodes 101_1 through 101_N can be implemented as one or more computers having the connector node logic, including the local log function 104 and the distributed locking function 105, implemented as one or more software programs that execute on the one or more computers. In various other implementations, the connector node logic is partially or wholly implemented in hardware.

Likewise, centralizing node 106 that collects logs, processes the logs into DAGs and then synthesizes the DAGs can be implemented as one or more software programs executing on one or more computers. The object storage system 103 can be implemented with one or more computers having non volatile storage media and software to execute functions of the object storage system.

Network 102 can be implemented as one or more networks such as any/all of one or more private networks and/or one or more public networks (such as the Internet). Network 102 can also be implemented with one or more local area networks, metropolitan area networks and/or wide area networks.

Figure 7:
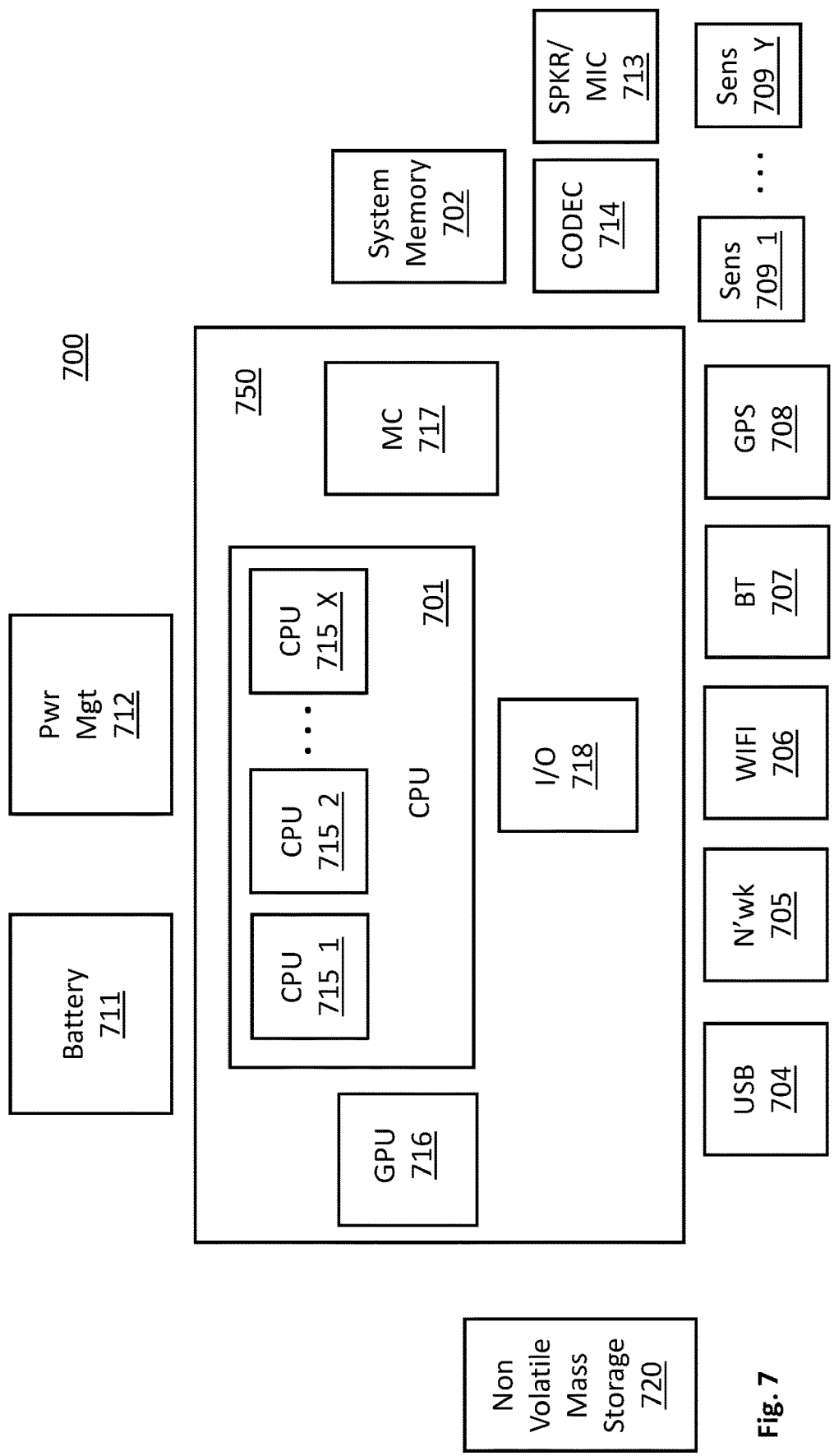
FIG. 7 shows a computing system.

FIG. 7 provides an exemplary depiction of a computing system 700 or computer such as any of the computers mentioned just above. As such, any of the aforementioned cloud services can be constructed, e.g., from networked clusters of computers having at least some of the components described below and/or networked clusters of such components.

As observed in FIG. 7, the basic computing system/computer 700 may include a central processing unit (CPU) 701 (which may include, e.g., a plurality of general purpose processing cores 715_1 through 715_X) and a main memory controller 717 disposed on a multi-core processor or applications processor, main memory 702 (also referred to as "system memory"), a local wired point-to-point link (e.g., universal serial bus (USB)) interface 704, a peripheral control hub (PCH) 718; various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a main memory controller 717 and a peripheral control hub (PCH) 718 (also referred to as I/O controller and the like). The general purpose processing cores 715 typically execute the operating system and application software of the computing system. The graphics processing unit 716 typically executes graphics intensive functions to, e.g., generate graphics information that is presented on a display. The main memory controller 717 interfaces with the main memory 702 to write/read data to/from main memory 702. The power management control unit 712 generally controls the power consumption of the system 700. The peripheral control hub 718 manages communications between the computer's processors and memory and the I/O (peripheral) devices.

Each of the communication interfaces 704-707, the GPS interface 708, the sensors 709, and the speaker/microphone codec 713, 714 all can be viewed as various forms of I/O (input and/or output) relative to the overall computing system including, where appropriate, an integrated peripheral device as well. Depending on implementation, various ones of these I/O components may be integrated on the applications processor/multi-core processor 750 or may be located off the die or outside the package of the applications processor/multi-core processor 750. The computing system also includes non-volatile mass storage 720 which may be the mass storage component of the system. The non-volatile mass storage 720 may be implemented with one or more solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable storage medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. The program code is to be executed by one or more computers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    emulating a file system with an object storage system, including having data objects, representing files with file objects, and representing directories with directory objects;
    constructing a directed acyclic graph (DAG) based on logs of change requests to the file system received from user interfaces to the file system, the DAG including a base node for the directory objects coupled to a sequence of nodes for each file object, the sequence having a file node and nodes for changes to the file in the file system;
    removing an irrelevant node from a sequence of nodes in the DAG, where the irrelevant node contains data that is obviated by a subsequent node in the sequence of nodes for the file object; and,
    applying changes corresponding to the change requests described by remaining nodes of the DAG to the object storage system, to update the file system as implemented in the object storage system.

2. The method of claim 1 wherein the nodes in the sequence of nodes for the file object each include a same key value, the key being a unique identifier to the object storage system of the directory or the file of the file system.

3. The method of claim 2 wherein the nodes in the sequence of nodes for the file object each include a different version number, the sequence of nodes arranged in version number order.

4. The method of claim 1 wherein the change requests that generated the sequence of nodes each include the same key value.

5. The method of claim 1 wherein the DAG comprises linking nodes that represent an insertion of files and/or directories beneath their parent directories, each linking node receiving a first sequence of nodes that represents a corresponding parent directory and a second sequence of nodes that represents a corresponding file or directory that is being inserted beneath the corresponding parent directory.

6. The method of claim 1 wherein the DAG comprises un-linking nodes that represent the removal of files and/or directories from beneath their parent directories, each un-linking node receiving a first sequence of nodes that represents a corresponding parent directory and a second sequence of nodes that represents a corresponding file or directory that is being removed from beneath the corresponding parent directory.

7. The method of claim 1 wherein the one or more irrelevant nodes comprise a first node that represents removal of a first file or directory from a parent directory and a second that represents insertion of the first file or directory into the parent directory.

8. The method of claim 1 wherein the one or more irrelevant nodes comprise a node that represents a change made to a file other than a most recent change made to the file.

9. One or more machine readable storage media having program code stored thereon, the program code to perform a method when performed by one or more computers, the method comprising:
    emulating a file system with an object storage system, including having data objects, representing files with file objects, and representing directories with directory objects;
    constructing a directed acyclic graph (DAG) based on logs of change requests to the file system received from user interfaces to the file system, the DAG including a base node for the directory objects coupled to a sequence of nodes for each file object, the sequence having a file node and nodes for changes to the file in the file system;
    removing an irrelevant node from a sequence of nodes in the DAG, where the irrelevant node contains data that is obviated by a subsequent node in the sequence of nodes for the file object; and,
    applying changes corresponding to the change requests described by remaining nodes of the DAG to the object storage system, to update the file system as implemented in the object storage system.

10. The one or more machine readable storage media of claim 9 wherein the nodes in the sequence of nodes for the file object each include a same key value, the key being a unique identifier to the object storage system of the directory or the file of the file system.

11. The one or more machine readable storage media of claim 10 wherein the nodes in the sequence of nodes for the file object each include a different version number, the sequence of nodes arranged in version number order.

12. The one or more machine readable storage media of claim 9 wherein the change requests that generated the sequence of nodes each include the same key value.

13. The one or more machine readable storage media of claim 9 wherein the DAG comprises linking nodes that represent an insertion of files and/or directories beneath their parent directories, each linking node receiving a first sequence of nodes that represents a corresponding parent directory and a second sequence of nodes that represents a corresponding file or directory that is being inserted beneath the corresponding parent directory.

14. The one or more machine readable storage media of claim 9 wherein the DAG comprises un-linking nodes that represent the removal of files and/or directories from beneath their parent directories, each un-linking node receiving a first sequence of nodes that represents a corresponding parent directory and a second sequence of nodes that represents a corresponding file or directory that is being removed from beneath the corresponding parent directory.

15. The one or more machine readable storage media of claim 9 wherein the one or more irrelevant nodes comprise a first node that represents removal of a first file or directory from a parent directory and a second that represents insertion of the first file or directory into the parent directory.

16. The one or more machine readable storage media of claim 9 wherein the one or more irrelevant nodes comprise a node that represents a change made to a file other than a most recent change made to the file.

17. One or more computers, the one or more computers having respective processors, memory and storage media, the storage media containing program code that when processed by the respective processors causes a method to be performed, the method comprising:
    emulating a file system with an object storage system, including having data objects, representing files with file objects, and representing directories with directory objects;
    constructing a directed acyclic graph (DAG) based on logs of change requests to the file system received from user interfaces to the file system, the DAG including a base node for the directory objects coupled to a sequence of nodes for each file object, the sequence having a file node and nodes for changes to the file in the file system;
    removing an irrelevant node from a sequence of nodes in the DAG, where the irrelevant node contains data that is obviated by a subsequent node in the sequence of nodes for the file object; and,
    applying changes corresponding to the change requests described by remaining nodes of the DAG to the object storage system, to update the file system as implemented in the object storage system.

18. The one or more computers of claim 17 wherein the nodes in the sequence of nodes for the file object each include a same key value, the key being a unique identifier to the object storage system of the directory or the file of the file system.

19. The one or more computers of claim 18 wherein the nodes in the sequence of nodes for the file object each include a different version number, the sequence of nodes arranged in version number order.

20. The one or more computers of claim 17 wherein the DAG comprises linking nodes that represent an insertion of files and/or directories beneath their parent directories, each linking node receiving a first sequence of nodes that represents a corresponding parent directory and a second sequence of nodes that represents a corresponding file or directory that is being inserted beneath the corresponding parent directory.

* * * * *